United States Patent
Sirotkin et al.

(10) Patent No.: US 9,380,494 B2
(45) Date of Patent: Jun. 28, 2016

(54) SYSTEMS, METHODS AND DEVICES FOR TRAFFIC OFFLOADING

(71) Applicant: Intel IP Corporation, Santa Clara, CA (US)

(72) Inventors: Alexander Sirotkin, Petach Tikva (IL); Mo-Han Fong, Sunnyvale, CA (US); Nageen Himayat, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 176 days.

(21) Appl. No.: 14/318,098

(22) Filed: Jun. 27, 2014

(65) Prior Publication Data

US 2015/0092553 A1  Apr. 2, 2015

Related U.S. Application Data

(60) Provisional application No. 61/883,731, filed on Sep. 27, 2013.

(51) Int. Cl.
*H04W 28/08* (2009.01)
*H04W 24/02* (2009.01)
(Continued)

(52) U.S. Cl.
CPC .............. *H04W 28/08* (2013.01); *H04W 48/16* (2013.01); *H04W 88/06* (2013.01)

(58) Field of Classification Search
CPC ..... H04W 88/06; H04W 28/08; H04W 36/22; H04W 48/18; H04W 28/0289; H04W 36/14; H04W 48/16; H04W 28/0247; H04W 36/0083; H04W 48/20; H04W 76/046; H04W 88/10; H04W 36/18; H04W 48/06; H04W 48/08
See application file for complete search history.

(56) References Cited

U.S. PATENT DOCUMENTS 9,271,316 B2 *  2/2016  Bakker .............. H04W 76/021
2012/0023189 A1  1/2012  Giaretta et al.
(Continued)

FOREIGN PATENT DOCUMENTS

KR  1020130017857 A  3/2014
WO  2011098660 A1  8/2011
(Continued)

OTHER PUBLICATIONS

NSN, Nokia Corporation, Deutsche Telekom; (Compromising) WLAN IW Solution for UEs with and without ANDSF; R2-132327,3GPP TSG-RAN WG2 Meeting #83, Barcelona, Spain, Aug. 19-23, 2013, R2-132327. 5 pages.*
(Continued)

*Primary Examiner* — Ahmed Elallam
(74) *Attorney, Agent, or Firm* — Stoel Rives LLP

(57) ABSTRACT

Wireless communication traffic can be offloaded from a user equipment (UE) to two wireless points of access. For example, user equipment (UE) is connected to a radio access network (RAN) using a radio access technology (RAT) such as a long term evolution (LTE) network. The UE can determine which network capabilities are available for traffic offloading and adapt to the capabilities presented. In one embodiment, the UE can determine whether the network supports three different configurations and configure traffic offloading to operate within the network conditions: (1) RAN rules without access network detection and selection function (ANDSF), (2) ANDSF in conjunction with RAN rules or (3) enhanced ANDSF with RAN assistance.

24 Claims, 8 Drawing Sheets

(51) Int. Cl.
  *H04W 88/06* (2009.01)
  *H04W 48/16* (2009.01)

(56) References Cited

U.S. PATENT DOCUMENTS

| | | | |
|---|---|---|---|
| 2012/0120824 A1* | 5/2012 | Meylan | H04W 48/10 370/252 |
| 2012/0230191 A1* | 9/2012 | Fang | H04W 36/22 370/235 |
| 2013/0041981 A1 | 2/2013 | Kim et al. | |
| 2013/0070596 A1 | 3/2013 | Yeh et al. | |
| 2013/0242783 A1* | 9/2013 | Horn | H04W 24/10 370/252 |
| 2014/0064068 A1* | 3/2014 | Horn | H04W 28/0289 370/230 |
| 2014/0133304 A1* | 5/2014 | Pica | H04W 48/20 370/232 |
| 2014/0328193 A1* | 11/2014 | Horn | H04W 24/00 370/252 |
| 2015/0003253 A1* | 1/2015 | Wolfner | H04W 28/08 370/237 |
| 2015/0038142 A1* | 2/2015 | Wang | H04W 48/12 455/436 |
| 2015/0063301 A1* | 3/2015 | Faccin | H04W 8/02 370/331 |
| 2015/0092745 A1* | 4/2015 | Roeland | H04W 36/22 370/331 |
| 2016/0044567 A1* | 2/2016 | Baghel | H04W 36/22 370/331 |

FOREIGN PATENT DOCUMENTS

| | | |
|---|---|---|
| WO | 2011157129 A2 | 12/2011 |
| WO | 2012138091 A2 | 10/2012 |

OTHER PUBLICATIONS

Notification of Transmittal of the International Search Report and the Written Opinion of the International Searching Authority, or the Declaration for PCT/US2014/050736, dated Nov. 21, 2014.

"3rd Generation Partnership Project; Technical Specification Group Services and Systems Aspects; Architecture enhancements for non-3GPP accesses," Release 12, 3GPP TX 23.402 V12.2.0 (Sep. 2013), pp. 1-256.

* cited by examiner

SYSTEMS, METHODS AND DEVICES FOR TRAFFIC OFFLOADING

RELATED APPLICATION

This application claims the benefit under 35 U.S.C. §119 (e) of U.S. Provisional Application No. 61/883,731 filed Sep. 27, 2013, which is incorporated by reference herein in its entirety.

TECHNICAL FIELD

The present disclosure relates to traffic offloading and more particularly relates to wireless traffic offload based at least in part on network information.

DETAILED DESCRIPTION OF PREFERRED EMBODIMENTS

Figure 1:
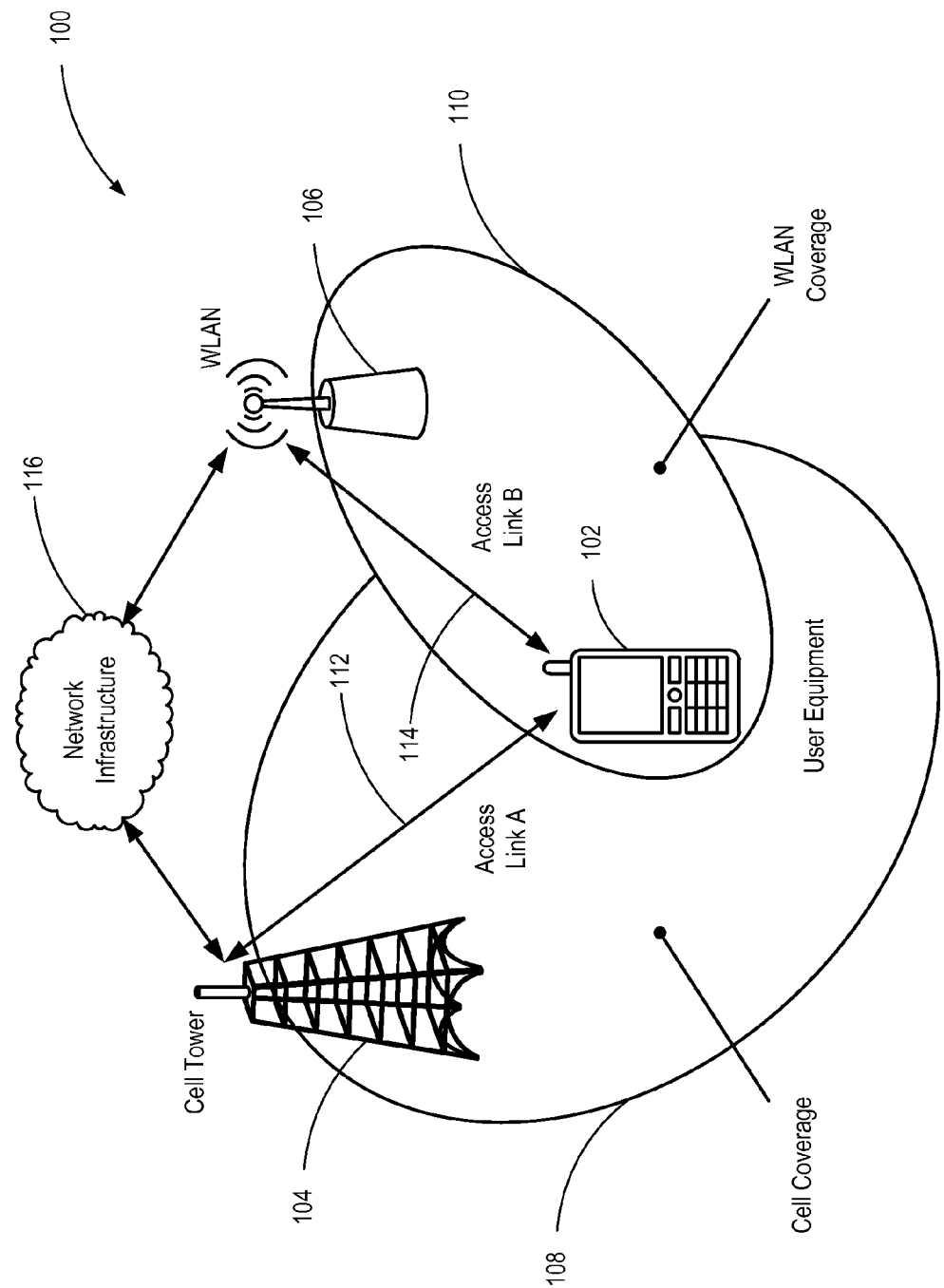
FIG. 1 is a schematic diagram illustrating a communication system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable wireless communication traffic offloading between two wireless points of access. For example, a user equipment (UE) is connected to a radio access network (RAN) using a radio access technology (RAT) such as a Mobile Broadband (MBB) Network (e.g., an LTE network). The UE can determine which network capabilities are available for traffic offloading and adapt to the capabilities presented. In one embodiment, the UE can determine whether the network supports three different configurations: (1) RAN rules without access network detection and selection function (ANDSF), (2) ANDSF in conjunction with RAN rules or (3) enhanced ANDSF with RAN assistance. If the UE determines that a (1) RAN rules without ANDSF is the configuration warranted, the UE can use RAN assistance information with RAN rules to determine whether to perform traffic offloading. If the UE determines that (2) ANDSF in conjunction with RAN rules configuration is warranted, RAN rules are evaluated together with ANDSF, RAN assistance is used in RAN rule evaluation. If the UE determines that an (3) enhanced ANDSF with RAN assistance is configuration warranted, RAN assistance information is used to evaluate ANDSF rules.

In one embodiment corresponding to the first scenario, the UE receives offload configuration information from RAN that describes thresholds of network quality measurements and restrictions on which packet data networks (PDNs) can be offloaded from LTE. The UE can obtain a description of available networks, such as WLAN identifiers, that are available for traffic offloading. Using network rules based at least in part on the thresholds, the UE can evaluate on whether to offload traffic to other available networks. Based on the evaluation and the restrictions, the UE can offload some of the PDNs to an available network (such as a wireless local area network (WLAN) access point (AP)).

In one embodiment corresponding to the third scenario, the UE receives offload configuration information from the LTE network evolved packet core (EPC) that describes thresholds of network quality measurements and restrictions on which packet data networks (PDNs) can be offloaded from LTE. The UE can obtain a description of available networks, such as WLAN identifiers, that are available for traffic offloading. Using network rules based at least in part on the thresholds, the UE can evaluate on whether to offload traffic to other available networks. Based on the evaluation and the restrictions, the UE can offload some of the PDNs to an available network (such as a wireless local area network (WLAN) access point (AP)).

In another embodiment, traffic offloading can also occur in the opposite direction. A user equipment (UE) is connected to a WLAN AP. The UE receives offload configuration information from the EPC that describes thresholds of network quality measurements and restrictions on which packet data networks (PDNs) can be offloaded from the WLAN. The UE can obtain a description of available networks, such as evolved node B (eNB or eNodeB) identifiers, that are available for traffic offloading via LTE. Using network rules based at least in part on the thresholds, the UE can evaluate on whether to offload traffic to other available networks. Based on the evaluation and the restrictions, the UE can offload some of the PDNs to an available network (such as an eNB).

Wireless mobile communication technology uses various standards and protocols to transmit data between a base station and a wireless mobile device. Wireless communication system standards and protocols can include the 3rd Generation Partnership Project (3GPP) long term evolution (LTE) standard; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

A common goal in cellular wireless networks (such as 3GPP networks) is efficient use of licensed bandwidth. One way that a UE or other mobile wireless device, helps to reduce usage of licensed bandwidth is through offloading. For example, a UE is configured to connect to other types of networks in addition or alternatively to a cellular wireless network through which at least some data may be offloaded. In one embodiment, a UE is configured to connect to a wireless local area network (WLAN) (such as a Wi-Fi network) and route traffic flows over the WLAN to reduce the usage of bandwidth on a 3GPP or other cellular wireless network.

In the Evolved Packet System (EPS) within 3GPP, the access network detection and selection function (ANDSF) has defined mechanisms that enable devices to determine which access technology is preferable for connection and/or preferable for certain IP traffic under specific conditions, e.g., through the use of an inter-system mobility policy (ISMP) and/or inter-system routing policy (ISRP). At present, legacy ANDSF policies provide limited support for parameters that are related to radio network conditions (however, such policies may be enhanced through further assistance from the radio network in some embodiments, including LTE related radio parameters). This restricts the ability of an operator to provide policies that favor a specific 3GPP radio access technology (RAT) over another one with reference to another non-3GPP specific RAT preference.

Depending on network infrastructure, traffic offloading can be supported using RAN assistance, legacy ANDSF and enhanced ANDSF embodiments. In a first embodiment (see also FIG. 4) RAN provides assistance information such as offload preference indicator (OPI), WLAN thresholds (bss load, RSNI, RCPI, etc.), RAN thresholds (RSRP, etc.) and/or other information. The embodiment can be used with ANDSF, if ANDSF rules are enhanced to use such information. In a second embodiment (see also FIG. 5) RAN provides assistance information similar to solution 1. Parameters included in the assistance information are used by rules defined in RAN specifications such as 3GPP TS 36.304, version 12.0.0, published Mar. 19, 2014 and 3GPP TS 25.304, version 12.1.0, published Mar. 19, 2014. If ANDSF is not deployed, WLAN identifiers are provided via radio resource control (RRC) signaling, open mobile alliance device management (OMA DM) or other means. If ANDSF is deployed, ANDSF rules can be evaluated together with RAN rules.

Different operators can have different deployment scenarios. While certain operators plan to deploy ANDSF and therefore prefer an ANDSF solution, some other operators prefer to have a solution that does not depend on ANDSF. A hybrid solution that works with and without ANDSF can serve the needs of many operators. Additionally, while certain operators may deploy a solution based on legacy or enhanced ANDSF, roaming UEs from other operators may implement different solutions. Therefore, it is important to define how different embodiments can be implemented in the same UE.

While many of the examples focus on a UE offloading traffic from an LTE to a WLAN, for the sake of clarity, it should be recognized that offloading can also occur in the opposite direction and with varying wireless technologies (such as various radio access technologies (RATs)). For example, this functionality supports moving/steering/offloading traffic in both directions, i.e., from cellular to WLAN and from WLAN to cellular. Thus, the UE and network infrastructure can cooperate to allow moving traffic between cellular networks and other wireless technologies.

FIG. 1 is a schematic diagram of a communication system 100 for providing wireless communication services to a UE 102 or other mobile wireless device. In the embodiment shown, the system 100 includes a UE can be in communication with a cell tower 104 and WLAN AP 106. The UE is located in a geographic position that includes cell coverage 108 from a cell tower 104 and WLAN coverage 110 from a WLAN AP 106. The cell tower 104 and WLAN AP 106 include a backhaul connection to network infrastructure 116. The UE 102 can communicate over access link A 112 with cell tower 104 and over access link B 114 with WLAN AP 106.

In one embodiment, a UE 102 is within a macro cell provided by a cell tower 104. The UE 102 determines a service cannot be sufficiently provided by cell tower 104 over access link A 112. Using offload configuration data, the UE 102 determines that at least the service can be offloaded to another connection. The UE 102 obtains a description of available networks, such as a WLAN network provided by WLAN AP 106. The UE 102 evaluates the available networks based on a set of rules. Based on the rules, the UE 102 determines to connect to WLAN AP 106 and steer at least some traffic over access link B 114.

For example, the UE 102 can be a cellular device communicating with an eNB as the cell tower 104 and a WLAN AP 106. The UE 102 communicates with cell tower 104 using LTE. The UE 102 evaluates the LTE connection over access link A 112 (such as 3GPP signal strength indicators or offload preference indicator (OPI)) in conjunction with a rule (such as an ANDSF rule or RAN rule). The UE 102 can receive the list of available networks and configuration information over ANDSF (or RAN). Using the configuration information, offload rules and the list of available networks, the UE 102 can determine to connect to WLAN AP 106 using an IEEE 802.11 protocol. UE 102 can further evaluate which PDNs to steer over 802.11 and which protocols that remain over LTE. In some embodiments, all communications can be routed over 802.11 and UE 102 can cause the LTE hardware to go into a low power state.

The list of available networks can be received through several methods. Without ANDSF, the list of available networks can be broadcast by RAN. With ANDSF, the UE can request the list of available networks. With ANDSF the list (along with other ANDSF policies) can also be pushed to the UE by the ANDSF server.

In another embodiment, a UE 102 is within a WLAN coverage 110 provided by WLAN AP 106. The UE 102 determines a service cannot be sufficiently provided by WLAN AP 106 over access link B 114. Using offload configuration data, the UE 102 determines that at least the service can be offloaded to another connection. Even if no traffic goes via LTE, the UE can remain camped on LTE (e.g., the UE does not perform 3GPP cell selection at this moment). The UE 102 evaluates the available networks based on a set of rules. Based on the rules, the UE 102 determines to steer at least some traffic over access link A 112.

In one embodiment, a UE 102 is within a macro cell provided by a cell tower 104. The UE 102 determines a service cannot be sufficiently provided by cell tower 104 over access link A 112. Using offload configuration data, the UE 102 determines that at least the service can be offloaded to another connection. The UE 102 obtains a description of available networks, such as a WLAN network provided by WLAN AP 106. The UE 102 evaluates the available networks based on a set of rules. Based on the rules, the UE 102 determines not to connect to WLAN AP 106 or other available network and does not offload traffic.

It should be recognized that a backhaul connection to network infrastructure is not exclusively a wired connection. Backhaul can include relays, point-to-point wireless, wired connections, fronthaul connections and other connections from a receiver of an access link of a UE (such as cell tower 104 or WLAN AP 106) to network infrastructure 116.

Other wireless radio access technologies (RATs) and wireless connections can be also be used. These RATs can include global system for mobile communications (GSM) networks, general packet radio services (GPRS) network, enhanced data rates for GSM Evolution (EDGE) networks, 3GPP LTE networks, IEEE 802.11 (Wi-Fi) and IEEE 802.16 (Worldwide Interoperability for Microwave Access (WiMAX)).

Figure 2:
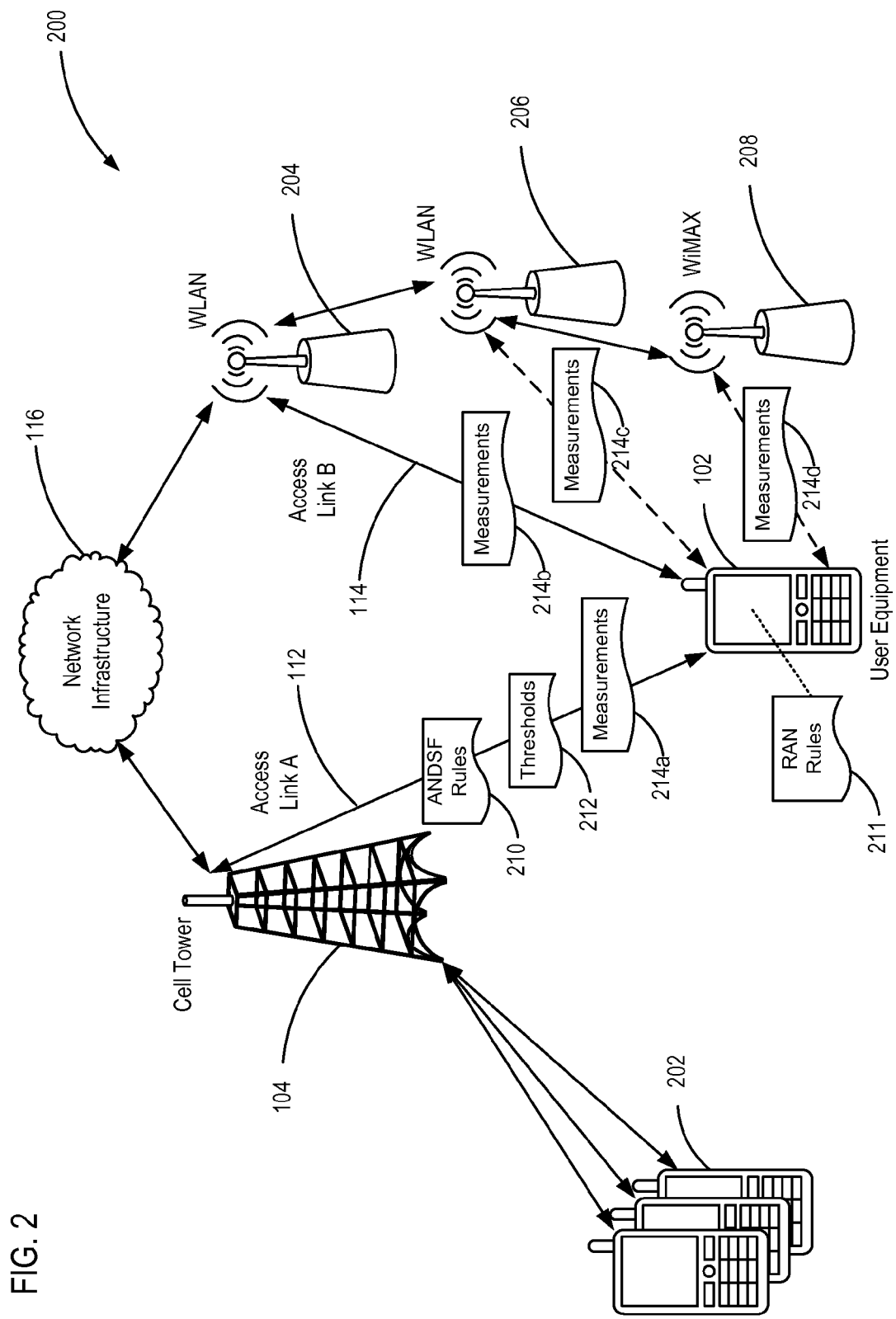
FIG. 2 is a schematic diagram illustrating an example of user equipment (UE) and wireless local area network (WLAN) access points (APs) consistent with embodiments disclosed herein.

FIG. 2 is a schematic diagram illustrating an example of user equipment (UE) and wireless local area network (WLAN) access points (APs). A plurality of UEs are connected to cell tower 104, which can include UE 102. Cell tower 104 is connected to network infrastructure 116. The UE 102 can also connect to available networks 204, 206 and 208. In the embodiment shown, a WiMAX base station 208 relays to WLAN AP 206 which relays to WLAN AP 204 which has a backhaul to network infrastructure 116.

In one embodiment, UE 102 is connected to cell tower 104 and has RAN rules 211 stored within. A plurality of other UEs 202 are also connected to cell tower 104. UE 102 can receive configuration data including ANDSF rules 210 and thresholds 212 from network infrastructure and/or cell tower 104. UE 102 can also perform measurements 214a of the network infrastructure and/or cell tower 104. Using this configuration data, UE 102 can determine that a rule or rules (210 and/or 211) for attempting traffic offloading is/are satisfied. The UE can measure information about available networks 204, 206 and 208 from network infrastructure 116. The UE can receive information about available networks 204, 206 and 208 as well as more rules 210 (with the aid of ANDSF), thresholds 212 and measurements 214a from network infrastructure and/or cell tower 104. The UE 102 can also receive measurements 214b, 214c and 214d (directly or indirectly) from available networks 204, 206 and 208. Using rules, which can include rules 210, and measurements 214a, 214b, 214c and 214d, the UE 102 can determine one or more networks for traffic offloading. In the embodiment shown, the UE 102 determines to connect and offload traffic with WLAN AP 204 (shown by the solid line). UE 102 also retains access link A 112 with cell tower 104.

It should be recognized that when traffic moving, steering or offloading is mentioned, it is for clarity. However, the embodiment can be modified to use any of the moving, steering or offloading when appropriate.

In one embodiment, a RAN (such as represented by cell tower 104 and network infrastructure 116) sends assistance information (such as thresholds) via RRC. Thresholds can include LTE/UMTS (Universal Mobile Telecommunications System) and WLAN thresholds. UE 102 acquires actual measurements for LTE/UMTS and WLAN APs (e.g., the UE 102 measures certain values for LTE/UMTS and WLAN networks). UE 102 then compares measurements acquired to the thresholds received. UE 102 can then determine whether to offload traffic or remain with a current RAN.

Assistance information can include thresholds coming from RAN and parameters measured by UE 102. RAN rules are defined in the following 3GPP technical specifications (TS): 36.304 and 25.304

Figure 3:
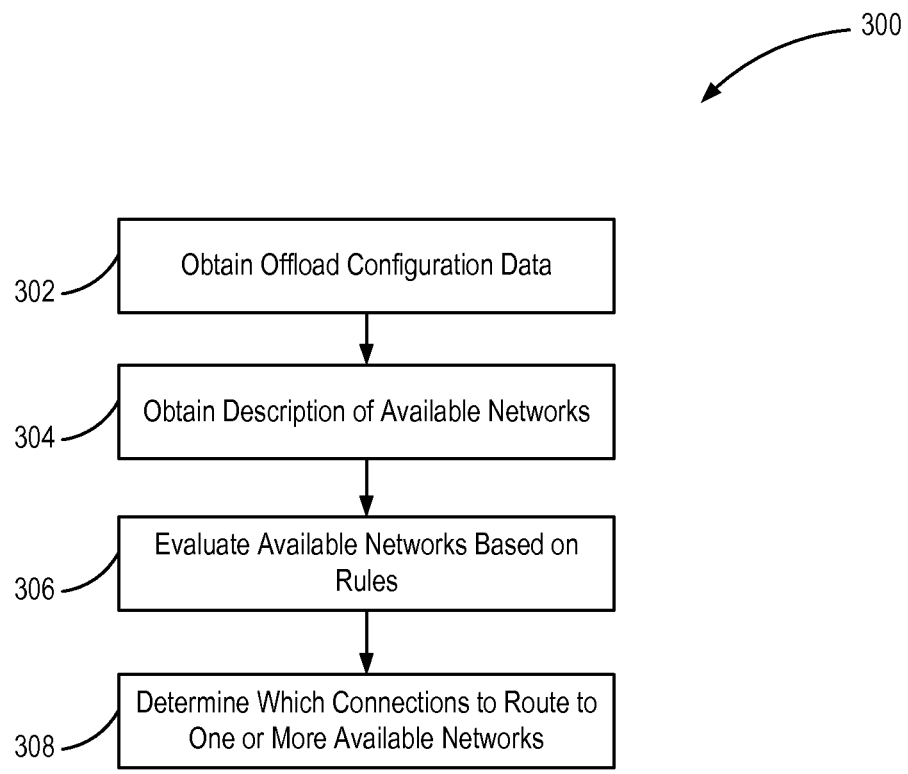
FIG. 3 is a schematic diagram of a method for offloading traffic consistent with embodiments disclosed herein.
Figure 4:
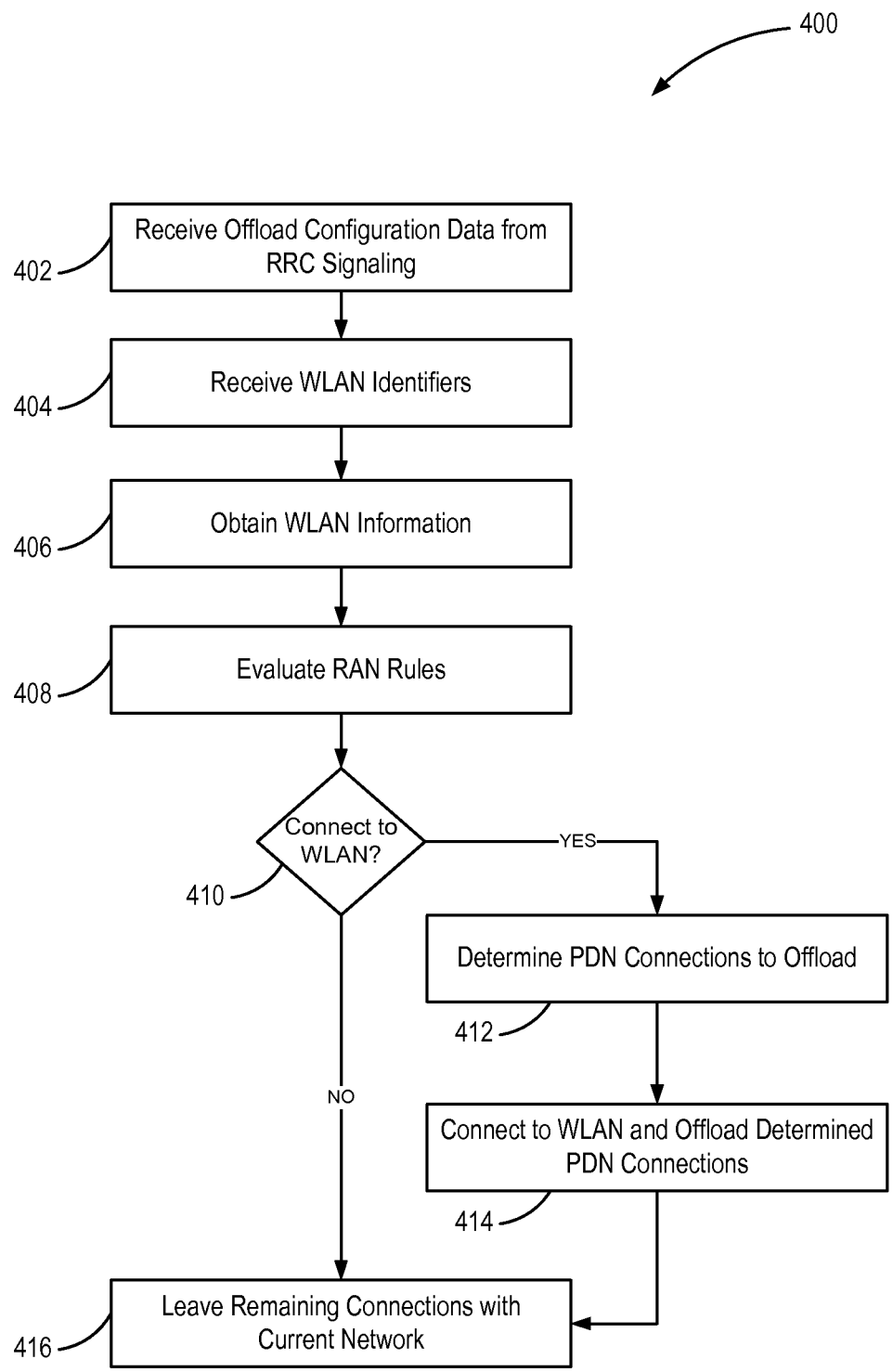
FIG. 4 is a schematic diagram of a more detailed method for offloading traffic consistent with embodiments disclosed herein.
Figure 5:
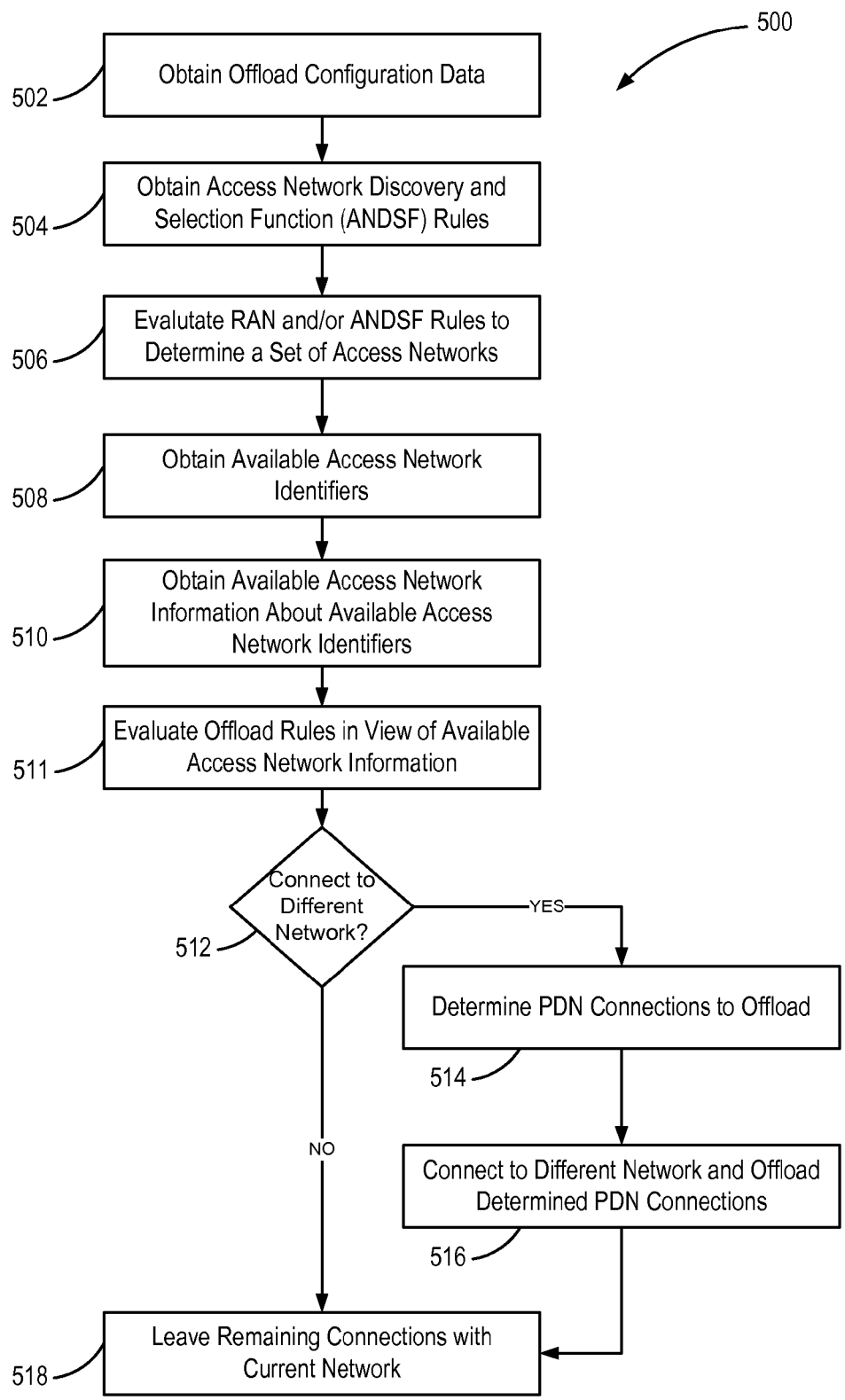
FIG. 5 is a schematic diagram of an alternate method for offloading traffic consistent with embodiments disclosed herein.
Figure 6:
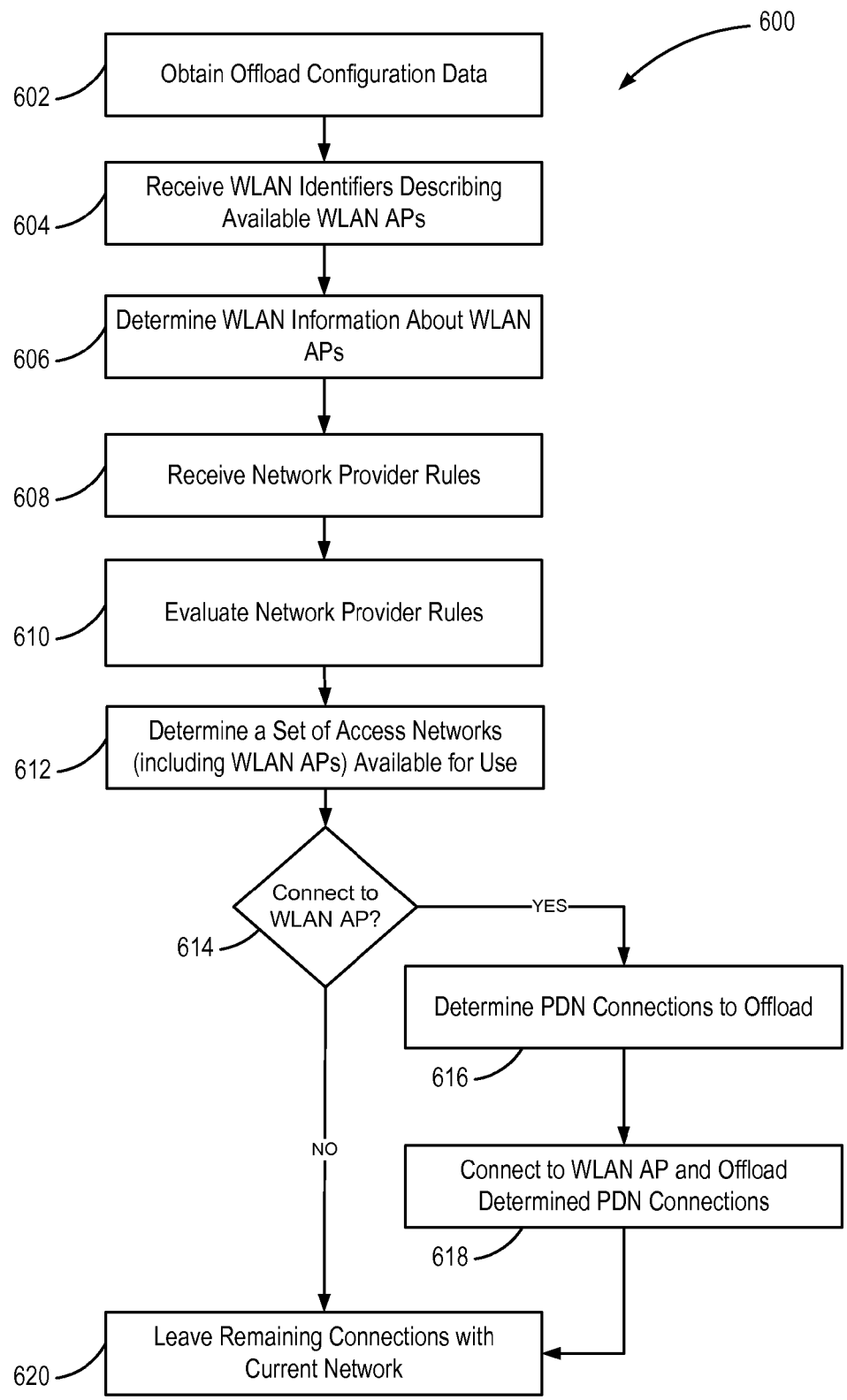
FIG. 6 is a schematic diagram of another method for offloading traffic consistent with embodiments disclosed herein.

A UE can be configured to identify network capabilities and then operate using the identified capabilities. FIGS. 3-6 show methods of traffic moving/steering/offloading (e.g., from cellular to WLAN and from WLAN to cellular) depending on network capabilities. FIG. 3 shows a simplified method of traffic offloading. FIG. 4 shows a method of traffic offloading using RRC. FIG. 5 shows a method of traffic offloading using legacy ANDSF. FIG. 6 shows a method of traffic offloading using enhanced ANDSF. A UE can be configured to identify and then operate within these identified networks.

FIG. 3 shows a process 300 of moving/steering/offloading traffic between a first network and a second network. The method can be accomplished by a system 100 or system 200 shown in FIGS. 1 and 2 by a UE 102, cell tower 104, network infrastructure 116 and WLAN AP 106. In block 302, a UE obtains offload configuration data. In block 304, a UE obtains descriptions of available networks. In block 306, the UE evaluates available networks based on rules. In block 308, the UE uses the rule results to determine which connections to route to one or more available networks.

The offload configuration data can be static or dynamic. In some embodiments, the offload configuration is statically stored on the UE. In other embodiments, the offload configuration data is stored on the UE, but periodically updated by network infrastructure messages (e.g., OMA DM). In one embodiment, the UE requests updated offload configuration data from the network infrastructure on demand.

FIG. 4 shows a process 400 of moving/steering/offloading traffic between a first network and a second network. The method can be accomplished by a system 100 or system 200 shown in FIGS. 1 and 2 by a UE 102, cell tower 104, network infrastructure 116 and WLAN AP 106. In the embodiment shown, an operator does not deploy ANDSF. In one embodiment, the method does not support per bearer traffic steering. In block 402, a UE receives offload configuration data from RRC signaling information. In block 404, the UE determines WLAN identifiers from available networks. In block 406, the UE obtains WLAN information, such as signal, load and quality information. In block 408, the UE evaluates RAN rules in light of the offload configuration information, WLAN information and/or RAN information. If the result of the evaluation is to connect to WLAN in block 410, the UE determines which PDN connections to offload in block 412. In block 414, the UE can then connect to the WLAN and offload the determined PDN connections 414. In either case in block 416, the UE can leave remaining connections with a current network.

In one embodiment, the UE operates on APN (Access Point Name) basis. APNs which should not be offloaded to WLAN, e.g., IMS APN (IP Multimedia System Access Point Name), may be configured to always stay on 3GPP network. The information about which APNs/PDN connections may be offloaded to WLAN may be pre-provisioned in the UE, provided as part of an enhanced APN configuration or via some other means. When the UE determines to offload to WLAN it moves all bearers from all APN connections which have been determined to be offloaded to WLAN. A similar process can be implemented for PDN connections.

For example, the UE acquires via broadcast or unicast RRC signaling RAN information related to WLAN offload (e.g. 3GPP load or other parameter reflecting the load, e.g., Offload Preference Indicator), 3GPP signal strength thresholds (e.g., RSRP threshold) and WLAN thresholds (e.g., RSNI, RCPI and BSS load thresholds).

The UE may then optionally evaluate RAN rules based on RAN information only and proceed to the next steps (in which rules based on RAN and WLAN information are evaluated) only if the rules allow offload to WLAN. Alternatively, the UE may acquire RAN and WLAN information and evaluate the rules only when all information is available. The UE may evaluate RAN rules (defined in RAN specs) to decide whether offload to WLAN is beneficial. RAN rules may be, for instance, of the form:

```
Offload to WLAN if: (RSNI > RSNI threshold 1) && (RSRP < RSRP
    threshold 1).
Stay on 3GPP if: (RSNI <= RSNI threshold 2) || (RSRP >= RSRP
    threshold 2).
```

If the rules tell the UE to stay on the network it currently uses it does so, otherwise the UE proceeds to the next operation. Different thresholds can be used in different directions to prevent UE ping-pong between networks (e.g., RSRP threshold 1 and RSRP threshold 2).

The UE can obtain information about WLAN networks it can access (i.e., the UE can acquire the list of WLAN identifiers). This list can be provided via OMA DM as defined in "Standardized Connectivity Management Objects, WLAN Parameters; For use with OMA Device Management; Approved Version 1.0-24 Oct. 2008; OMADDSDM_ConnMO_WLANV1_020081024A" or broadcast or unicast RRC signaling. This list can also be provided via ANDSF. Note that the UE may acquire the list of WLAN identifiers in this operation or in advance (e.g., when the system uses OMA DM).

Once UE acquires the list of WLAN identifiers, it acquires the WLAN information (e.g., RSNI, RCPI, BSS load, and/or WAN metrics as defined in HotSpot 2.0 (HS2.0) by the Wi-Fi Alliance (WFA)) from WLAN networks which it can use (i.e., which networks are on this list). Once UE acquires WLAN and RAN information it evaluates RAN rules (defined in RAN specs) for 3GPP network it currently uses and for all WLAN networks (out of the list acquired previously) that the UE can find. RAN rules may be, for instance, of the form:

```
Offload to WLAN if: (OPI > OPI threshold) && (RSRP < RSRP
    threshold) && (bss load < bss load threshold) && (RSSI > RSSI
    threshold)
Stay on 3GPP if: (OPI <= OPI threshold) || (RSRP >= RSRP
    threshold) || (bss load >= bss load threshold) || (RSSI <=
    RSSI threshold)
```

Based on these rules, the UE decides whether to use 3GPP or WLAN networks and which WLAN AP to connect to (if WLAN is selected) for every PDN connection that can use both. If the rules tell the UE to use WLAN, all bearers of all PDN connections that can use WLAN are moved to WLAN. The UE may use WLCP (WLAN Link Control Protocol), defined as part of SaMOG2 (Release12 SaMOG) WI, to establish WLAN connections and release these connections from EUTRAN/UTRAN. If there are multiple WLAN networks that satisfy the selection criteria, it is left for UE implementation to decide which network to use. For example, the UE determines to select the WLAN AP that provides the highest QoS (according to some criteria), from amongst the APs, which also satisfies RAN rules.

In a steady state operation, the UE continues to acquire 3GPP and WLAN parameters and to reevaluate RAN rules with periodicity which is left for UE implementation. For example, the reevaluation of RAN rules can be based on several considerations such as latency associated with inter-RAT mobility signaling or frequency with which assistance information is updated within the network. If all bearers are moved to WLAN the UE may detach from LTE. If so, the UE is expected to camp on UTRA and may acquire WLAN assistance information from UTRAN.

FIG. 5 shows a process 500 of moving/steering/offloading traffic between a first network and a second network. The method can be accomplished by a system 100 or system 200 shown in FIGS. 1 and 2 by a UE 102, cell tower 104, network infrastructure 116 and WLAN AP 106. In some embodiments, a network infrastructure operator deploys Rel-12 (or earlier) ANDSF which is not enhanced with RAN parameters. In block 502, the UE obtains offload configuration data. In block 504, the UE obtains ANDSF rules from the network infrastructure. In block 506, the UE evaluates RAN and/or ANDSF rules to determine a set of access networks. In block 508, the UE obtains available access network identifiers from networks available to the UE (e.g., in range of the UE). In block 510, the UE obtains available access network information (e.g., load, strength and quality information) about available access network identifiers. In block 511, the UE evaluates offload rules in view of available access network information. Based on the results of the evaluation in block 511, the UE determines whether to connect to a different network in block 512. If so and in block 514, the UE determines which PDN connections (or IP flow, depending on offload granularity) to offload to the different network. In block 516, the UE connects to the different network and offloads determined PDN connections. Then in block 518, whether or not the UE connects to the different network, the UE leaves remaining connections with the current network.

For example, similar to FIG. 4, the initial operations may optionally be performed. The UE acquires via broadcast or unicast RRC signaling RAN information related to WLAN offload (e.g., 3GPP load or other parameter reflecting the load), 3GPP signal strength thresholds (e.g., RSRP threshold) and WLAN thresholds (e.g., RSSI and BSS load thresholds).

The UE may then optionally evaluate RAN rules based on RAN information only and proceed to the next steps (in which rules based on RAN and WLAN information are evaluated) only if the rules allow offload to WLAN. Alternatively, the UE may acquire RAN and WLAN information and evaluate the rules only when all information is available. The UE may evaluate RAN rules (defined in RAN specs) to decide whether offload to WLAN is beneficial. If the evaluation is conclusive (e.g., the rules tell the UE not to use WLAN such as when the UE is in good LTE coverage and LTE load is very low) the UE process may stop further processing (to save power, etc. . . . ).

In one embodiment, ANDSF is used together with RAN rules in the same UE. The UE can acquire RAN assistance information (if such information is not already acquired previously) and WLAN assistance information. The UE selects and evaluates ANDSF and/or RAN rules based on operator preferences.

In another embodiment, the UE acquires ANDSF rules (if not available already) and evaluates them. As an output of this evaluation the UE gets a list of access networks (3GPP and WLAN) it can use (including ISRP and ISMP rules).

In an embodiment, the UE can acquire RAN assistance information (if such information is not already acquired previously) and WLAN assistance information. The UE then evaluates RAN rules in the same manner as described in FIG. 4.

As a result of this evaluation the UE may remove certain (3GPP and WLAN) access networks from the list produced by the evaluation of ANDSF rules. After that the UE proceeds (following either ISRP or ISMP rules) to use the networks which remain on that list as defined in corresponding SA2 and CT1 specifications (see S2a, S2b and S2c interfaces). The UE may use WLCP (WLAN Link Control Protocol) defined as part of SaMOG2 (Release12 SaMOG) WI to establish WLAN connections and release these connections from EUTRAN/UTRAN.

FIG. 6 shows a process 600 of moving/steering/offloading traffic between a first network and a second network. The method can be accomplished by a system 100 or system 200 shown in FIGS. 1 and 2 by a UE 102, cell tower 104, network infrastructure 116 and WLAN AP 106. In some embodiments, the operator of network infrastructure deploys ANDSF which is enhanced with RAN parameters. In block 602, the UE obtains offload configuration data. In block 604, the UE receives WLAN identifiers describing available WLAN APs. In block 606, the UE determines WLAN information about WLAN APs. In block 608, the UE receives network provider rules (such as by enhanced ANDSF). In block 610, the UE evaluates the network provider rules in view of the obtained information. In block 612, the UE determines a set of access networks (which can include WLAN APs) available for use. If the UE determines to connect to a WLAN AP (or other RAN) in block 614, the UE can determine which PDN connections or IP flows to offload in block 616. In block 618, the UE can connect to the WLAN AP and offload determined PDN connections. In either case and in block 620, the UE can leave remaining connections with a current network.

For example, the UE can acquire RAN and WLAN assistance information as described in connection with FIGS. 4 and 5. The UE then evaluates ANDSF rules that are enhanced to take RAN and WLAN assistance information. The enhanced ANDSF rules can be defined as depending on nodes. WLAN related ANDSF nodes may have subnodes for WLAN parameters (e.g., "maximum BSS load," "minimum RSSI," etc.). 3GPP related ANDSF nodes may have subnodes for RAN parameters (e.g., "maximum load," "minimum RSRP," etc.). Thresholds for these rules can be initially provided via ANDSF. Signal strength values (RSSI, RSRP, etc.) can be measured by the UE. Load values (cellular load, BSS load) can be provided by the network (RAN or WLAN).

Additionally in some embodiments, RAN may override signal strength (RSRP, RSNI, etc.) thresholds via RRC signaling. If RAN provides these thresholds the UE replaces them in all ANDSF rules.

The UE can then proceed according to ISRP or ISMP rules as defined in corresponding SA2 and CT1 specifications (see S2a, S2b and S2c interfaces). The UE may use WLCP (WLAN Link Control Protocol) defined as part of SaMOG2 (Release12 SaMOG) WI to establish WLAN connections and release these connections from EUTRAN/UTRAN.

Figure 7:
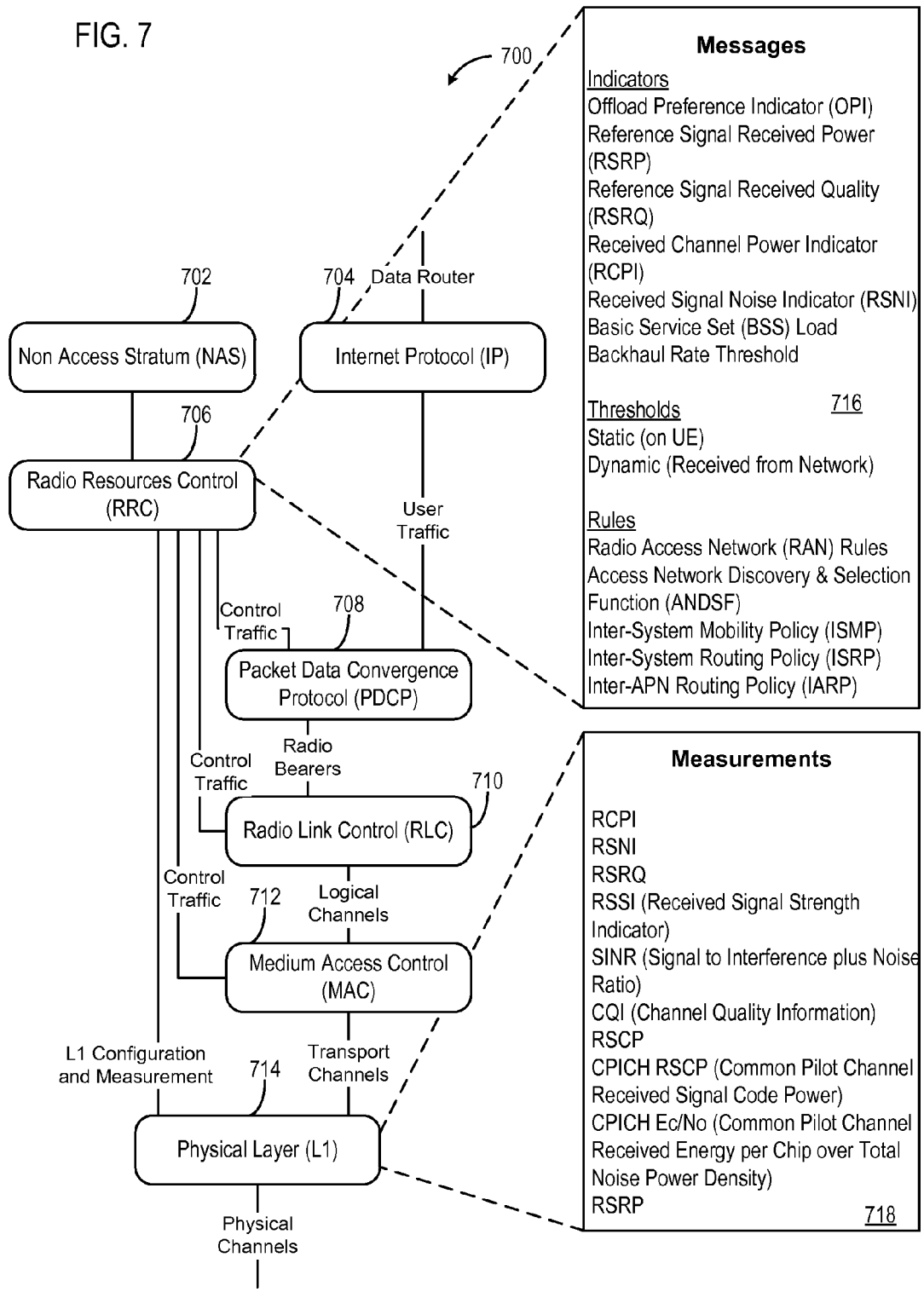
FIG. 7 is a schematic block diagram of an enhanced wireless protocol stack consistent with embodiments disclosed herein.

Various embodiments described herein can also be used to expand, update, use and/or provide new functionality to existing wireless systems (e.g., RATs, RANs, UTRAN, EUTRAN, etc.). In FIG. 7, an example of an enhanced LTE protocol stack 1000 for a UE is shown. The protocol stack 700 can be enhanced with new messages 716 and measurements 718 for use in connecting with small cells.

The stack describes protocol layers in an enhanced LTE protocol stack 700. These layers can provide abstraction from a lower layer (represented as a layer closer to the bottom of the page). A physical layer (L1) 714 includes systems that translate physical signals into logical data for use by the higher layers. L1 can also provide measurement and configuration services to the radio resource control (RRC) layer 706. The medium access control (MAC) layer 712 includes systems that perform transport as logical mapping and/or scheduling. The MAC layer 712 includes systems that can provide format selection and measurements about the network to the RRC layer 706. The radio link control (RLC) layer 710 includes systems that provide segmentation, concatenation and reassembly, and can operate in different modes depending on a radio bearer. The packet data convergence protocol (PDCP) layer 708 includes systems that can provide services for higher level protocols including cryptographic functions, header compression/decompression, sequence numbering and/or duplicate removal. User traffic can be sent through the PDCP layer 708 to the internet protocol (IP) layer 704, which is then routed to applications and systems of the UE for use. Control traffic can be sent to the RRC layer 706. The RRC layer 706 can provide management and control functions of the UE. RRC layer 706 functionality can include processing of broadcast information, paging, connection management with an eNB, integrity protection of RRC messages, radio bearer control, mobility functions, UE measurement and reporting, Quality of Service management, etc. The non-access stratum (NAS) layer 702 includes systems that can provide mobility management, call control, session management and/or identity management.

The RRC layer 706 and NAS layer 702 can be further enhanced with messages. The messages can include indicators, thresholds and rules. Indicators can include Offload Preference Indicator (OPI), Reference Signal Received Power (RSRP) Threshold, Reference Signal Received Quality (RSRQ) Threshold, Received Channel Power Indicator (RCPI) Threshold, Received Signal Noise Indicator (RSNI) Threshold, Basic Service Set (BSS) LoadThreshold and Backhaul Rate Threshold. Thresholds and/or indicators can be static (e.g., stored statically on the UE) or dynamic (e.g., received from the network). Rules can include Radio Access Network (RAN) Rules, Access Network Discovery & Selection Function (ANDSF) Rules, Inter-System Mobility Policy (ISMP), Inter-System Routing Policy (ISRP) and Inter-APN Routing Policy (IARP).

The physical layer can be enhanced with measurements to provide to layers of the UE (e.g., an L2 layer which includes the RRC layer). Measurements can include RCPI, RSNI, RSRP, RSRQ, RSSI (Received Signal Strength Indicator), SINR (Signal to Interference plus Noise Ratio), CQI (Channel Quality Information), RSCP, CPICH RSCP (Common Pilot Channel Received Signal Code Power), and CPICH Ec/No (Common Pilot Channel Received Energy per Chip over Total Noise Power Density).

Offload configuration can include thresholds received by UE via RRC. These include: parameters (RSRP threshold for LTE), RSRQ threshold (for LTE), CPICH RSCP threshold (for UMTS), CPICH Ec/No threshold (for UMTS), OPI (for LTE or UMTS), RCPI threshold (for WLAN), RSNI threshold (for WLAN), BSS load (for WLAN) threshold and backhaul rate threshold (for WLAN). LTE/UMTS (cellular) information can include measurements made by a UE such as RSRP measurement which the UE can compare to a RSRP threshold. WLAN information can include BSS load which a UE can compare to a BSS load threshold.

In some embodiments an Offload Preference Indicator (OPI) can be used instead of a load measurement.

While RRC is mentioned above, it is just one of many possible implementation options. Other options include other sections of the second protocol layer or access stratum layer (including RRC, PDCP, RLC and MAC).

Policies provided to the UE can be enhanced by having RAN assistance information. For example, a policy may include multiple candidate information simultaneously. An example of such policy can include a 3GPP to WLAN offload environment. If RAN RSRP is less than threshold S and RAN load is greater than threshold X, and if WLAN RSSI is greater than threshold R and WLAN BSS load is less than threshold Y, move flow to WLAN.

An example of a WLAN to 3GPP policy includes: If RAN RSRP is greater than threshold S' and RAN load is less than threshold X', and if WLAN RSSI is less than threshold R' and WLAN BSS load is greater than threshold Y', then move flow to UMTS/LTE.

In an embodiment, this policy can be realized with a new policy structure (similar to ISRP). The value of the thresholds (e.g., RAN RSRP/RSCP thresholds) can be provided by RAN and used in the ANDSF policy. Otherwise, threshold values may also be provided by the ANDSF itself. Policies specific to the UE can be configured or pre-provisioned based on the UE subscription. Optionally per UE control for traffic steering can be achieved using dedicated signaling during connected mode. For example, the RAN may send different values of the above parameters to different UEs in connected mode. Policies specific to a target WLAN system (e.g., SSID or realm) can be configured or pre-provisioned. Policies and network assisted information can also be used to route some flow to WLAN and some to 3GPP.

Mechanisms can be used to avoid simultaneous massive access network selection/traffic steering and ping-pong events (including hysteresis, randomization, different threshold values for 3GPP-to-WLAN than WLAN-to-3GPP network selection, or thresholds on per user subscription level which may be applied to UE based decision).

Figure 8:
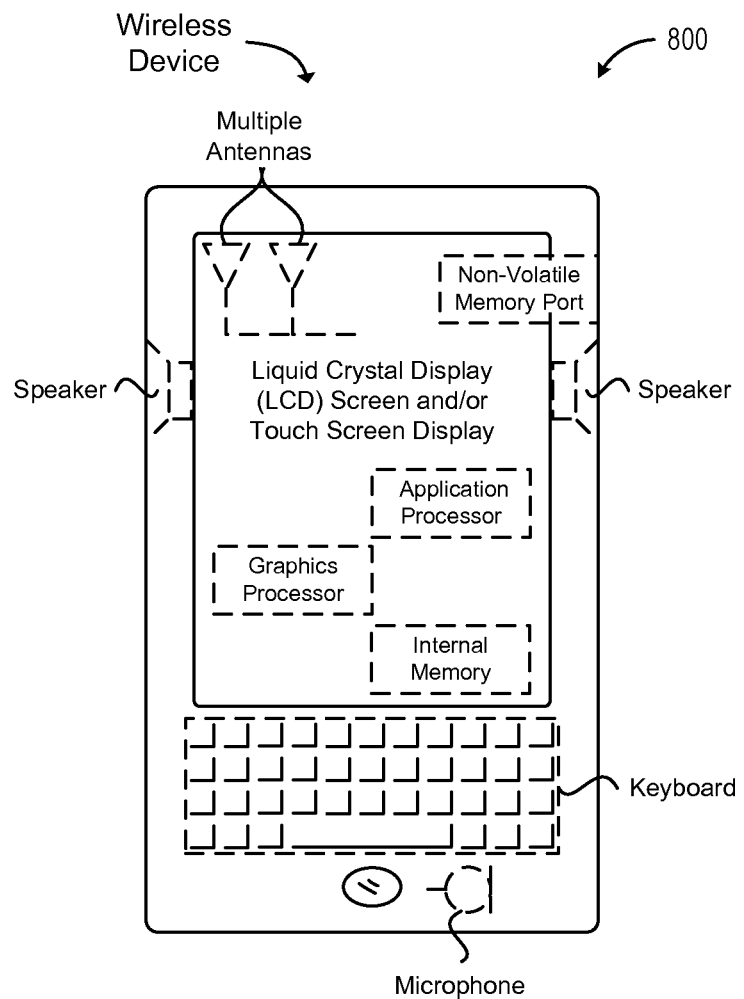
FIG. 8 is a schematic diagram of a mobile device consistent with embodiments disclosed herein.

FIG. 8 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Example Embodiments

Embodiments of this invention can be applied in several scenarios. For example, a UE is within UTRAN/E-UTRAN coverage, is using 3GPP and goes into WLAN AP coverage. A UE is within UTRAN/E-UTRAN and WLAN coverage, is using WLAN and goes out of WLAN AP coverage. In another example, a UE is within the coverage area of both UTRAN/E-UTRAN coverage and WLAN coverage, the UE is using WLAN, and all or a subset of the UE's traffic should be routed via UTRAN/E-UTRAN instead. In one example, a UE is within the coverage area of both UTRAN/E-UTRAN and WLAN, the UE is using UTRAN/E-UTRAN, but all or a subset of the UE's traffic should be routed via WLAN instead. In yet another example, a UE is using both UTRAN/E-UTRAN and WLAN access and should be connected to only one (WLAN or UTRAN/E-UTRAN) or some traffic should be moved to the other access.

Three embodiments are described below in WLAN-RAN based systems to aid in understanding aspects of the embodiments. It should be recognized that these embodiments are not exhaustive of the potential embodiments, but used to aid in understanding three possible implementations.

In a first embodiment, candidates for the WLAN-UTRAN/E-UTRAN (UTRAN/E-UTRAN are also referred to as "RAN" in the remainder of the present document) access network selection have been identified. RAN provides RAN assistance information to the UE through broadcast signaling (and optionally dedicated signaling). The UE uses the RAN assistance information UE thresholds and information provided by WLAN and policies that are obtained via the ANDSF or via existing OMA-DM mechanisms or pre-configured at the UE to steer traffic to WLAN or to RAN.

This embodiment can be applicable to UEs in RRC IDLE and RRC CONNECTED states for E-UTRAN; UE IDLE mode for UTRAN; and CELL_DCH, CELL_FACH, CELL_PCH and URA_PCH states for UTRAN. Assistance parameters can include load information (e.g., direct/indirect indication of UMTS/LTE load, e.g., in percentage, in load levels (low, medium, high) or offload preference indicator), resource allocation (maximum resource allocation the UE may receive on UMTS/LTE), WLAN thresholds (WLAN RSNI threshold, WLAN RCPI, WLAN BSS load threshold and WLAN WAN metric threshold) and/or RAN thresholds (RSRP/RSCP thresholds).

In a second embodiment, the offloading rules are specified in RAN specifications. The RAN provides (through dedicated and/or broadcast signaling) thresholds which are used in the rules. This embodiment can be applicable to UEs in RRC IDLE and RRC CONNECTED states for E-UTRAN, UE IDLE mode for UTRAN and CELL_FACH, CELL_PCH, URA_PCH and CELL_DCH states for UTRAN). In the embodiment, the RAN provides parameters through dedicated signaling and/or broadcast signaling. The UE follows RAN rules, defined in 3GPP RAN specifications, to perform bi-directional offloading between WLAN and 3GPP. User preference can take precedence, if so configured. Based on operator preference the UE may use ANDSF policies or RAN rules. An example rule is as follows:

```
if (measured_metricA < threshold1) && (measured_metricB >
    threshold2) {
    steerTrafficToWLAN ( );
} else if (measured_metricA > threshold3) || (measured_metricB <
    threshold4) {
    steerTrafficTo3gpp( );
}
```

In a third embodiment, User preference can be configured to always takes precedence over RAN based or ANDSF based rules (e.g., when a non-operator WLAN is preferred or WLAN is off).

In an embodiment, multiple branches based on rules are possible. In a first branch and if ANDSF is not present, the UE moves the traffic indicated in the steering command to WLAN or 3GPP as indicated. In a second branch and when multiple Access Networks are possible according to the ANDSF policy, the traffic steering commands can override order of access network priorities (e.g., if for certain IP flows ANDSF indicates a prioritized order of 3GPP access and WLAN). Upon reception of a command to steer traffic from 3GPP access to WLAN, the UE moves the corresponding flows to WLAN. In a third branch, the dedicated traffic steering command cannot override ANDSF in other cases (i.e., the UE will not move traffic to an access network not indicated by ANSDF as a possibility (i.e., not indicated or indicated as forbidden)). The above rules can apply whether the H-ANDSF or the V-ANDSF policy is active.

In one embodiment, based on operator preference/configuration, the UE selects either RAN rules or ANDSF. For example, if a roaming UE is in the network of the operator that uses RAN rules, while a home operator deploys ANDSF, the operator can configure the UE to ignore RAN rules and to follow ANDSF rules instead.

The above operations do not take into account user preference and/or the WLAN radio state, which can optionally affect the operations. For example, based on user preferences and/or WLAN radio state, a UE may not be able to perform the configured measurement events. Additionally, the procedures can allow a UE to be able to prioritize non-operator WLAN over operator WLAN. For example, the UE may disassociate from the operator WLAN and associate with the higher priority non-operator WLAN at any time during the measurement process. In some cases, some operations can be optional (such as measurement control and measurement report) based on RAN/UE configuration.

The operations, and the description can apply to UMTS CELL_FACH as well. The operations can also be extended to UMTS/LTE Idle modes and UMTS CELL/URA_PCH states, e.g., UEs can be configured to report some indication (e.g., on available WLAN measurements) in a RRC UL message, e.g., RRC connection request (from Idle, in UMTS/LTE) or CELL UPDATE (in UMTS CELL/URA_PCH states).

BSSID stands for Basic Service Set Identifier: For infrastructure BSS, the BSSID is the MAC address of the wireless access point and come from a Beacon or Probe Response. SSID stands for Service Set Identifier: The SSID can be used in multiple, possibly overlapping, BSSs and can come from a Beacon or Probe Response. HESSID stands for Homogeneous Extended Service Set Identifier: A MAC address whose value shall be configured by the Hotspot Operator with the same value as the BSSID of one of the APs in the network. All APs in the wireless network can be configured with the same HESSID value. The HESSID can come from a Beacon or Probe Response or 802.11 communications. A Domain Name List element provides a list of one or more domain names of the entity operating the WLAN access network and can come from ANQP (HS 2.0). The operating class and channel number is an Indication of the target WLAN frequency (see Annex E of 802.11 [5] for definitions of the different operating classes).

Both RCPI and RSNI can be measured by the UE. BSS Load can be obtained by a beacon or probe response (802.11k). WAN metrics can be obtained through ANQP (in HS2.0).

Examples for identifying the traffic to steer to or from WLAN can include DRB/RB-ID and QCI. DRB/RB-ID stands for an identity of a radio bearer. QCI stands for QoS (Quality of Service) Class Identifier.

Examples

The following examples pertain to further embodiments.

Example 1 is a mobile device comprising a mobile broadband (MBB) interface, a wireless network interface and a processor. The mobile broadband (MBB) interface is configured for connecting to 3rd generation partnership project (3GPP) networks. The wireless network interface is configured for connecting to non-MBB networks. The processor is configured to execute instructions that cause the mobile device to perform operations. The processer is configured to determine a MBB network configuration for processing offload rules. The processor is further configured to configure the mobile device to use offload rules compatible with the MBB network configuration. The processor is also configured to determine whether to offload traffic between the MBB interface and the wireless network interface based on the configured offload rules. The processor is further configured that when determined to offload, the processor determines which connections to offload between the MBB interface and the wireless network interface.

In example 2, the processsor of the mobile device of example 1 can be optionally configured to perform more operations. The procsssor can be configured to receive offload configuration data from radio resource control (RRC) signaling. The processor can be further configured to receive non-MBB identifiers describing available non-MBB access points (non-MBB APs) for offload of the connections. The processor can also be configured to obtain non-MBB information for the non-MBB identifiers. The processor can further be configured to evaluate the offload rules comprising radio access network (RAN) rules based at least in part on the offload configuration and the non-MBB information. The processor can also be configured to determine to connect to a non-MBB AP. The processor can be further configured to determine a set of the connections to offload to the non-MBB AP.

In example 3, the processor of the mobile device of examples 1-2 can be optionally configured to perform additional operations. The processor can be further configured to obtain MBB network information comprising offload configuration data. The processor can also be configured to obtain offload rules comprising access network discovery and selection function (ANDSF) rules. The processor can be further configured to evaluate the ANDSF rules to determine a set of access networks available for use, the set of access networks including a set of MBB networks and a set of non-MBB networks. The processor can also be further configured to obtain non-MBB access network identifiers describing available non-MBB networks for offload of the connections. The processor can be further configured to obtain non-MBB information for received non-MBB identifiers. The processor can also be configured to evaluate the offload rules based on the offload configuration, MBB network information and non-MBB information. The processor can be further configured to determine a subset of the set of access networks to remove from the set of access networks available for use. The processor can also be configured to determine whether to connect to a non-MBB network in the set of access networks available for use. The processor can be further configured such that when determined to connect to the non-MBB network, the processor determines which of the connections to offload to the non-MBB network.

In example 4, the processor of the mobile device of examples 1-3 can be optionally configured to perform additional operations. The processor can be further configured to receive non-MBB offload configuration data. The processor can also be configured to receive non-MBB identifiers describing available non-MBB access points (non-MBB APs) for offload of the connections. The processor can be further configured to determine non-MBB parameters for received non-MBB identifiers. The processor can also be configured to receive offload rules comprising network provider rules that reference MBB parameters and the non-MBB parameters. The processor can be further configured to evaluate the network provider rules based on the MBB parameters and non-MBB parameters. The processor can also be configured to determine a set of access networks available for use. The processor can be further configured to determine whether to connect to a non-MBB AP in the set of access networks available for use. The processor can be further configured such that when connecting to a non-MBB AP, the processor can determine which of the connections to offload to the non-MBB AP.

Example 5 is user equipment (UE) configured to receive offload configuration data from radio resource control (RRC) signaling. The UE is further configured to receive WLAN identifiers describing available wireless local area network access points (WLAN APs) for offload of packet data network (PDN) connections. The UE is also configured to obtain WLAN information for the WLAN identifiers. The UE is further configured to evaluate RAN rules based at least in part on the offload configuration and the WLAN information. The UE is also configured to determine to connect to a WLAN AP. The UE is further configured to determine a set of PDN connections to offload to the WLAN AP.

In example 6, the UE of example 5 can be optionally configured such that the offload configuration comprises one or more of 3rd generation partnership project (3GPP) offload preference indicator (OPI), reference signal received power (RSRP) threshold data, reference signal quality (RSRQ) threshold data, received signal strength indicator (RSSI) threshold data, received channel power indicator (RCPI) threshold data, received signal noise indicator (RSNI) threshold data or basic service set (BSS) load threshold data.

In example 7, the UE of examples 5-6 can be optionally configured such that receiving offload configuration further comprises evaluating the offload configuration to determine whether the RAN rules allow offload to WLAN and when the RAN rules do not allow offload to WLAN, stopping further processing of WLAN offload evaluation.

In example 8, the UE of examples 5-7 can be optionally configured such that evaluating the offload configuration to determine whether the RAN rules allow offload to WLAN further comprises comparing a RSRP to a RSRP threshold or comparing RSRQ measurement to an RSRQ threshold.

In example 9, the UE of examples 5-8 can be optionally configured such that receiving the WLAN identifiers further comprises obtaining the WLAN identifiers by open mobile alliance device management (OMA DM) object receipt, radio resource control (RRC) signaling or access network discovery and selection function (ANDSF).

In example 10, the UE of examples 5-9 can be optionally configured such that the WLAN information comprises at least one of signal strength basic service set (BSS) load, wide area network (WAN) metrics, received channel power indicator (RCPI) or received signal noise indicator (RSNI).

In example 11, the UE of examples 5-10 can be optionally configured such that determining to connect to the WLAN AP further comprises selecting the WLAN AP from a plurality of WLAN APs that satisfy the RAN rules.

Example 12 is a wireless mobile device comprising a cellular network interface, a wireless network interface and a processor. The cellular network interface is configured for connecting to 3rd generation partnership project (3GPP) networks. The wireless network interface is configured for connecting to non-3GPP networks. The processor is configured to execute instructions that cause the wireless mobile device to perform operations. The processor can be configured to obtain cellular network information comprising offload configuration data. The processor can be further configured to obtain access network discovery and selection function (ANDSF) rules. The processor can also be configured to evaluate the ANDSF rules to determine a set of access networks available for use, the set of access networks including a set of 3GPP networks and a set of non-3GPP networks. The processor can be further configured to obtain non-3GPP access network identifiers describing available non-3GPP networks for offload of packet data network (PDN) connections. The processor can also be configured to obtain non-3GPP information for received non-3GPP identifiers. The processor can be further configured to evaluate offload rules based on the offload configuration, cellular network information and non-3GPP information to. The processor can also be configured to determine a subset of the set of access networks to remove from the set of access networks available for use. The processor can be further configured to determine whether to connect to a non-3GPP network in the set of access networks available for use. The processor can also be configured such that when determined to connect to the non-3GPP network, the processor determines which PDN connections to offload to the non-3GPP network.

In example 13, the UE of example 12 can be optionally configured such that the offload rules are radio access network (RAN) rules.

In example 14, the UE of examples 12-13 can be optionally configured such that the 3GPP networks comprise global system for mobile communications (GSM) network, general packet radio services (GPRS) network, enhanced data rates for GSM Evolution (EDGE) network, universal mobile telecommunications system (UMTS) network, long term evolution (LTE) network or LTE advanced network.

In example 15, the UE of examples 12-14 can be optionally configured such that the non-3GPP networks further comprise Wi-Fi networks or Wi-Max networks.

In example 16, the UE of examples 12-15 can be optionally configured such that the ANDSF rules comprise inter-system mobility policy (ISMP) rules, inter-system routing policy (ISRP) rules or inter-APN routing policy (IARP) rules.

In example 17, the UE of examples 12-16 can be optionally configured such that obtaining the ANDSF rules further comprises obtaining the ANDSF rules from a 3GPP network provider.

In example 18, the UE of examples 12-17 can be optionally configured such that obtaining the ANDSF rules further comprises obtaining the ANDSF rules from static pre-provisioned UE storage.

In example 19, the UE of examples 12-18 can be optionally configured such that obtaining the ANDSF rules further comprises pre-provisioning the ANDSF rules in the UE.

In example 20, the UE of examples 12-19 can be optionally configured such that connecting to the non-3GPP network further comprises using WLAN link control protocol (WLCP) to establish WLAN connections and release connections from the 3GPP network for the PDN connections to offload.

Example 21 is a method for offloading cellular traffic to wireless local area network (WLAN) traffic. The method includes receiving WLAN offload configuration data. The method further includes receiving WLAN identifiers describing available wireless local area network access points (WLAN APs) for offload of data connections. The method also includes determining WLAN parameters for received WLAN identifiers. The method further includes receiving network provider rules that reference cellular parameters and the WLAN parameters. The method also includes evaluating the network provider rules based on the cellular parameters and WLAN parameters. The method further includes determining a set of access networks available for use. The method also includes determining whether to connect to a WLAN AP in the set of access networks available for use. When connecting to a WLAN AP, the method includes determining which data connections to offload to the WLAN AP.

In example 22, the method of example 21 can be optionally configured such that the network provider rules are access network discovery and selection function (ANDSF) rules that include the cellular parameters and the WLAN parameters.

In example 23, the method of examples 21-22 can be optionally configured such that the data connections are packet data network (PDN) connections.

In example 24, the method of examples 21-23 can be optionally configured such that the network provider rules further comprise validity criteria that describe WLAN parameter thresholds to compare with the WLAN parameters.

In example 25, the method of examples 21-24 can be optionally configured such that determining WLAN parameters further comprises receiving WLAN parameters thresholds from a second protocol layer of a user equipment (UE) that is lower than a first protocol layer that evaluates the network provider rules.

In example 26, the method of example 25 can be optionally configured such that determining WLAN parameters comprises a comparison with a threshold performed in the second protocol layer.

In example 27, the method of example 25 can be optionally configured such that determining WLAN parameters comprises a value and a threshold determined by the second protocol layer, and a comparison between the value and a threshold is performed in the first protocol layer as part of the evaluating network provider rules.

In example 28, the method of example 25 can be optionally configured such that the second protocol layer is a radio resource control (RRC) layer, packet data convergence protocol (PDCP) layer, radio link control (RLC) layer or medium access control (MAC) layer.

In example 29, the method of example 25 can be optionally configured such that the second protocol layer is an access stratum layer.

In example 30 the method of example 25 can be optionally configured such that the first protocol layer is ANDSF.

Example 31 is a method for moving traffic between a cellular network and wireless local area network (WLAN) traffic. The method includes determining available cellular network radio access networks (RANs). The method further includes receiving cellular offload configuration data. The method also includes receiving WLAN identifiers describing available wireless local area network access points (WLAN APs). The method further includes determining WLAN parameters for received WLAN identifiers. The method also includes receiving network provider information that includes cellular parameters. The method further includes evaluating network provider rules based on the cellular parameters and WLAN parameters. The method also includes determining a set of access networks available for use, the set of access networks comprising WLAN APs and cellular network RANs. The method further includes determining whether to connect to a cellular network RAN in the set of access networks available for use. When connecting to a cellular network RAN, the method includes determining which data connections to offload to the cellular network RAN.

In example 32, the UE of example 31 can be optionally configured such that determining WLAN parameters further comprises receiving WLAN parameters thresholds from a second protocol layer of a user equipment (UE) that is lower than a first protocol layer that evaluates the network provider rules.

In example 33, the method of examples 31-32 can be optionally configured such that receiving network provider information that includes the cellular parameters further comprises a comparison with a threshold performed in the second protocol layer.

In example 34, the method of examples 31-33 can be optionally configured such that receiving network provider information that includes the cellular parameters further comprises a value and a threshold determined by the second protocol layer, and a comparison between the value and a threshold is performed in the first protocol layer as part of the evaluating network provider rules.

In example 35, the method of example 34 can be optionally configured such that the first protocol layer is higher than the second protocol layer.

In example 36, the method of examples 21-34 can be optionally configured such that receiving WLAN parameter thresholds from a second protocol layer of a user equipment (UE) that is lower than a first protocol layer that evaluates the network provider rules. The method can also be optionally configured such that receiving cellular parameter thresholds from a second protocol layer of a user equipment (UE) that is lower than a first protocol layer that evaluates the network provider rules. The method can be optionally configured such that performing a comparison between a value and a threshold in the first protocol layer as part of evaluating network provider rules. The method can also be optionally configured such that determining a value and a threshold by a second protocol layer and performing a comparison between the value and a threshold in the first protocol layer as part of the evaluating network provider rules.

In example 37, the method of examples 21-34 can be optionally configured such that the network provider rules further comprise one or more of access network discovery and selection function (ANDSF) rules and radio resource control (RRC) rules.

Example 38 is an apparatus comprising means to perform a method as described in any of examples 21-37.

Example 39 is machine readable storage including machine readable instructions, when executed, to implement a method or realize an apparatus as claimed in any of claims 21-37.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s)

may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A method for offloading cellular traffic to wireless local area network (WLAN) traffic, the method comprising:
   receiving WLAN offload configuration data;
   receiving WLAN identifiers describing available wireless local area network access points (WLAN APs) for offload of data connections;
   determining WLAN parameters for received WLAN identifiers;
   receiving network provider rules that reference cellular parameters and the WLAN parameters;
   evaluating the network provider rules based on the cellular parameters and WLAN parameters to:
      determine a set of access networks available for use;
      determine whether to connect to a WLAN AP in the set of access networks available for use; and
      when connecting to a WLAN AP, determine which data connections to offload to the WLAN AP.

2. The method of claim 1, wherein the network provider rules are access network discovery and selection function (ANDSF) rules that include the cellular parameters and the WLAN parameters.

3. The method of claim 1, wherein determining WLAN parameters further comprises receiving WLAN parameters thresholds from a second protocol layer of a user equipment (UE) that is lower than a first protocol layer that evaluates the network provider rules.

4. The method of claim 3, wherein determining WLAN parameters comprises a comparison with a threshold performed in the second protocol layer.

5. The method of claim 3, wherein determining WLAN parameters comprises a value and a threshold determined by the second protocol layer, and a comparison between the value and a threshold is performed in the first protocol layer as part of the evaluating network provider rules.

6. The method of claim 3, wherein the second protocol layer is a radio resource control (RRC) layer, packet data convergence protocol (PDCP) layer, radio link control (RLC) layer or medium access control (MAC) layer.

7. A user equipment (UE) configured for access network selection and traffic steering, the UE comprising:
   a first wireless interface to communicate through a wireless wide area network (WWAN);
   a second wireless interface to communicate through a wireless local area network (WLAN); and a processor configured to:
receive, from a mobility management function in an evolved packet core (EPC) of the WWAN, offload information indicating one or more first packet data network (PDN) connections authorized for offload to the WLAN and one or more second PDN connections restricted from offload to the WLAN;
receive radio access network (RAN) assistance information through radio resource control (RRC) signaling from the WWAN;
determine, based on a comparison of the RAN assistance information with offload rules, to offload traffic to the WLAN; and
in response to the determination to offload traffic, offload the one or more first PDN connections to the WLAN.

8. The UE of claim 7, wherein the offload information corresponds to a specific WWAN radio access technology.

9. The UE of claim 7, wherein the offload information is based on subscription data corresponding to the UE.

10. The UE of claim 7, wherein the offload rules comprise access network discovery and selection function (ANDSF) rules including at least one of an inter-system routing policy (ISRP) rule and an inter-access point name (APN) routing policy (IARP) rule, and wherein the ANDSF rules comprise one or more threshold conditions and an offload preference indicator (OPI) condition.

11. The UE of claim 10, wherein the one or more threshold conditions is associated with a WWAN threshold provided by the RAN assistance information, and wherein the processor is further configured to evaluate the one or more threshold conditions by comparing the WWAN threshold with a corresponding measured value.

12. The UE of claim 10, wherein a first threshold condition of the one or more threshold conditions is associated with a first WLAN threshold provided in the RAN assistance information, and wherein the processor is further configured to evaluate the first threshold condition by comparing the first WLAN threshold with a corresponding value received from the WLAN.

13. The UE of claim 12, wherein a second threshold condition of the one or more threshold conditions is associated with a second WLAN threshold provided by the ANDSF, and wherein the processor is further configured to evaluate the second threshold condition by comparing the second WLAN threshold provided by the ANDSF with a corresponding value received from the WLAN.

14. The UE of claim 13, wherein the processor is further configured to receive, through the RRC signaling, a third WLAN threshold associated with the second threshold condition, and wherein the processor is further configured to replace the second WLAN threshold with the third WLAN threshold so as to evaluate the second threshold condition by comparing the third WLAN threshold with a corresponding value received from the WLAN.

15. The UE of claim 7, wherein the RAN assistance information comprises at least one of a WWAN threshold and a WLAN threshold.

16. The UE of claim 15, wherein the WWAN threshold is selected from a first group comprising a reference signal received power (RSRP) threshold, a common pilot channel (CPICH) per chip over total noise power density (Ec/No) threshold, and reference signal received quality (RSRQ) threshold; and
wherein the WLAN threshold is selected from a second group comprising a beacon received signal strength indicator (RSSI) threshold, a backhaul data rate threshold, and a basic service set (BSS) load threshold.

17. The UE of claim 7, further comprising at least one of a speaker, a microphone, a connection port, a keyboard, a touch screen, a battery, a memory port, and one or more antennas.

18. The UE of claim 7, wherein the WWAN comprises a third generation partnership project (3GPP) network.

19. The UE of claim 18, wherein the WLAN comprises a non-3GPP network.

20. At least one non-transitory computer-readable storage medium having stored thereon instructions that, when executed by one or more processors, cause the one or more processors to perform operations comprising:
process radio access network (RAN) assistance parameters to identify a wireless local area network (WLAN) for traffic offload;
receive a first radio resource control (RRC) signal indicating a first packet data network (PDN) connection that is allowed to be offloaded from a wireless wide area network (WWAN) to the WLAN; and
select the first PDN connection for communication through the WLAN;
receive a second RRC signal indicating a second PDN connection that is restricted from offload from the WWAN to the WLAN; and
select the second PDN connection for communication only through the WWAN.

21. The at least one non-transitory computer-readable storage medium of claim 20, wherein the RAN assistance parameters comprise at least one of a WWAN threshold and a WLAN threshold.

22. The at least one non-transitory computer-readable storage medium of claim 21, wherein the WWAN threshold is selected from a first group comprising a reference signal received power (RSRP) threshold, a common pilot channel (CPICH) per chip over total noise power density (Ec/No) threshold, and reference signal received quality (RSRQ) threshold; and
wherein the WLAN threshold is selected from a second group comprising a beacon received signal strength indicator (RSSI) threshold, a backhaul data rate threshold, and a basic service set (BSS) load threshold.

23. At least one non-transitory computer-readable storage medium having stored thereon instructions that, when executed by one or more processors in an evolved packet core (EPC) of a wireless wide area network (WWAN), cause the one or more processors to perform operations comprising:
generate offload information indicating one or more first packet data network (PDN) connections authorized for offload from the WWAN to a wireless local area network (WLAN) and one or more second PDN connections restricted from offload to the WLAN;
communicate the offload information to a user equipment (UE); and
communicate radio access network (RAN) assistance information through radio resource control (RRC) to the UE, the RAN assistance information including rules to determine whether to perform traffic offloading to the one or more first PDN connections authorized for offload from the WWAN to the WLAN.

24. The at least one non-transitory computer-readable storage medium of claim 23, wherein the RAN assistance information comprises at least one of a WWAN threshold and a WLAN threshold.

* * * * *